July 31, 1934.
C. A. ELLIS
1,968,673
STORAGE TANK
Filed Nov. 11, 1930
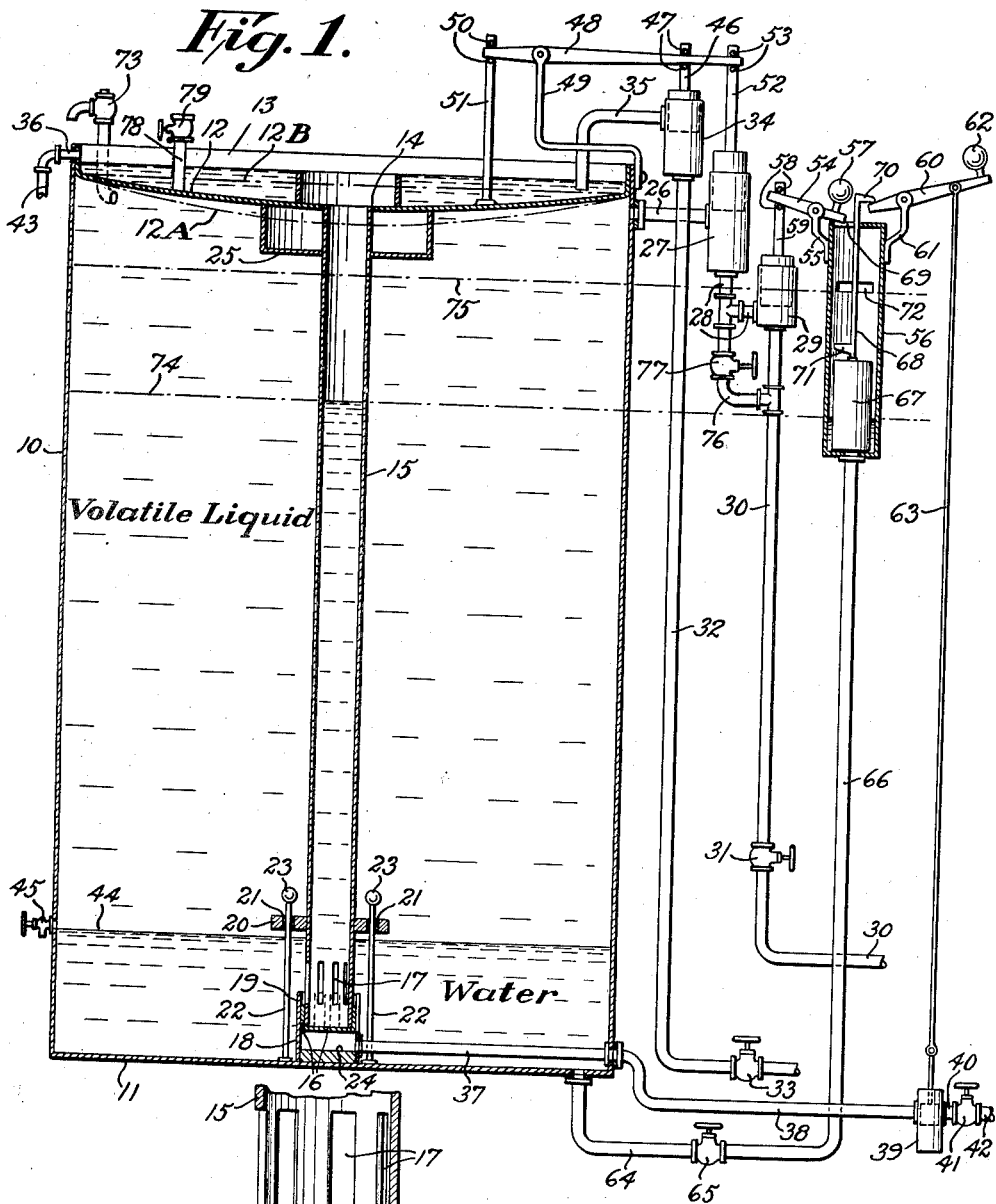
INVENTOR
Clifford A. Ellis
BY
Lee Allan Severn
ATTORNEY Patented July 31, 1934

1,968,673

UNITED STATES PATENT OFFICE 1,968,673

STORAGE TANK

Clifford A. Ellis, Ridgefield, N. J., assignor to Socony-Vacuum Oil Company, Incorporated, New York, N. Y., a corporation of New York Application November 11, 1930, Serial No. 494,825

14 Claims. (Cl. 221—67)

This invention relates to storage tanks or receptacles and more particularly relates to tanks for storing volatile liquids, such as gasoline and the like.

Volatile liquids, particularly gasoline, have heretofore generally been stored in closed tanks so arranged that the surface of the liquid therein is not in contact with the roof of the tank, especially if the tank is not filled to its maximum capacity. The volume of the space between the surface of the liquid and the tank roof varies inversely as the volume of the liquid in the tank and the evaporation of the liquid in the tank causes this space to become filled with saturated vapors of the liquid. Due to the temperature changes to which these tanks are subjected, the saturated vapor expands and contracts. Upon expansion, some of the vapors are lost by being forced out of the tank into the atmosphere through the vents with which the tanks are ordinarily provided and upon contraction, fresh air is drawn into the vapor space and further evaporation of the liquid in the tank ensues until the space is again filled with saturated vapors of the liquid. Frequent expansions and contractions of this nature, or "breathing" as it is usually called, coupled with repeated fillings of the tank and the more or less constant leakage of the vapors from the roof seams results in the loss of a substantial quantity of the stored liquid.

The present invention prevents these breathing and other losses by providing a storage tank in which the liquid stored therein is at all times in contact with the roof of the tank regardless of whether the tank is being filled or liquid is being withdrawn therefrom, to thereby eliminate any vapor space in the tank and prevent evaporation of the liquid.

To acomplish this, I store the liquid in a tank embodying my invention, over a layer of water or other liquid of higher specific gravity than the liquid stored and with which it is not miscible. I introduce the volatile liquid into the tank and withdraw it therefrom at a point just below the tank roof and regulate the depth of the water in the bottom of the tank so that the liquid is at all times in contact with the tank roof including the time during which the tank is filled and during withdrawal of liquid therefrom. I provide a flexible or diaphragm type of roof for the tank and utilize the movement of the roof to automatically regulate and control the flow of liquid and water into and out of the tank. I also provide means for maintaining a blanket of water over the entire roof of the tank.

The nature of the present invention will become apparent from the following description considered in connection with the accompanying drawing forming a part thereof which illustrates a preferred form of the present invention and in which:

Fig. 1 is a more or less diagrammatic view in longitudinal section of a storage tank embodying the present invention, and Fig. 2 is an enlarged sectional view of a portion of the tank.

Referring to the drawing, reference character 10 represents a cylindrical tank having a bottom 11 and a roof 12. The roof 12 is a flexible or diaphragm type of roof having an upstanding peripheral flange 13 which is suitably secured to the rim of the tank. The central portion of the roof may be supported by suitable rafters, columns or other means not shown. The roof is preferably fabricated of light steel plates and, except when in its high position, is concave or dished as shown. The roof is provided with a central aperture 14 and a cylindrical pipe 15 of relatively large diameter and light weight is passed therethrough and is secured to the roof so as to provide an air and water tight joint therewith. The inlet end of pipe 15 projecting above the roof is enlarged as shown and the lower end of the pipe is closed by a machined steel boot 16 secured thereto. Pipe 15 is also provided adjacent its lower end with a series of spaced elongated slots 17. Boot 16 on the lower end of pipe 15 forms a plunger which is adapted to reciprocate in a cylinder 18 secured to the bottom 11 of the tank in axial alignment with pipe 15. The walls of cylinder 18 are provided with spaced extensions 19 which serve to guide the lower end of pipe 15 and the plunger. The plunger is also maintained in alignment with the cylinder 18 by means of a collar 20 secured to the pipe above the slots 17. This collar is provided with a pair of sleeves 21 which slide on a pair of guides 22 secured to the bottom of the tank. The upward movement of pipe 15 and the roof 12 of the tank is limited by stops 23 on the upper ends of the guides 22 and the downward movement thereof is limited by the bottom 24 of cylinder 19.

Secured to the underside of roof 12 and preferably surrounding pipe 15 is a hollow float box 25 of sufficiently large proportions to sustain the pipe in a floating position when the box is entirely immersed in the liquid or product stored in the tank. When the tank is filled with product and at certain other times, as will hereinafter be described, the product will exert an upward pressure on the roof and will flex the roof upwardly to a slight extent and when this upward pressure is released, the roof will flex downwardly. Stops 23 and 24 are positioned so as to closely limit the movement of the roof and prevent it from being subjected to stresses of a magnitude which will tend to open the joints of the roof. In practice, only a few ounces of pressure will be required to flex the roof upwardly and the distance through which the central portion of the roof moves is preferably limited so that the roof will in no instance be reversed in curvature or be convex outwardly.

The liquid to be stored is introduced into the tank and withdrawn therefrom through a pipe 26 connected to the upper portion of the tank, preferably immediately below the roof 12. This pipe is connected to an automatically operated plunger valve 27, or other suitable type of valve which is connected by a pipe 28 to another automatically operated plunger valve 29. A pipe 30 connected to valve 29 has a manually operated valve 31 therein.

The water over which the liquid is stored in tank 10 is introduced into the bottom of the tank through pipe 15 and the slots 17 in the lower end thereof. This water is supplied to the roof 12 of the tank, and in positions of the roof below its neutral position, this position being that shown in full lines in Fig. 1, flows over the edge of the upper enlarged intake end of pipe 15. The water is supplied to the tank roof through a pipe 32 provided with a hand-operated valve 33 and through an automatically operated plunger valve 34 into a pipe 35 which has its outlet end disposed below the upper edge of the tank as shown. The upper level of the water on the roof 12 is limited by means of an overflow pipe 36. Water is withdrawn from the bottom of tank 10 through a pipe 37 connected to the lower portion of cylinder 18 and to a pipe 38. Pipe 38 is connected to an automatically operated plunger valve 39 which is connected by means of a pipe 40 to a manually operated valve 41 which has a pipe 42 connected thereto. Spillway 36 may advantageously be connected to pipe 42 by means of a pipe 43. The water level in the bottom of tank 10 is preferably not permitted to fall below the level 44 so as to maintain a seal for the slots 17 in pipe 15 and to provide a relatively small depth of water above the upper ends of the slots for a purpose presently to appear. A valve 45 or other suitable device is mounted on the tank at the level 44 to provide means for determining whether or not this water level is being maintained.

The flow of water on to the roof of the tank is automatically cut-off at predetermined times, as will presently appear, by means of the plunger valve 34. The plunger of valve 34 is provided with a forked rod 46 which carries a pair of spaced rollers 47. Valve 34 is operated by means of a lever 48 pivoted to a bracket 49 secured to the upper edge of tank 10. One end of lever 48 is disposed between rollers 47 on plunger rod 46 and the other end of lever 48 is disposed between a pair of spaced rollers 50 carried by the forked upper end of a post 51 mounted on the roof 12 of the tank at a suitable point between the center and periphery thereof, the exact location depending upon the amount of movement required for lever 48.

The flow of liquid product to and from the tank is automatically controlled at two different points in the liquid product line by means of plunger valves 27 and 29. The plunger of valve 27 is provided with a plunger rod 52 having a forked upper end which carries a pair of spaced rollers 53 and the right-hand end of lever 48, as viewed in the drawing is disposed between these rollers. Valve 29 is operated by means of a weighted lever 54 pivoted between its ends to a bracket 55 secured to a container 56, presently to be described. One end of lever 54 has a weight 57 secured thereto and the other end is disposed between spaced rollers 58 on the upper forked end of plunger rod 59 secured to the plunger of valve 29.

The flow of water from the bottom of tank 10 is automatically controlled by means of plunger valve 39. This valve is operated by a weighted lever 60 pivoted to a bracket 61 secured to container 56. The lever is provided with a suitable weight 62 and is connected to the plunger of valve 39 by a rod 63.

From the bottom of tank 10, a pipe 64 leads to a manually operated valve 65, thence to a vertically disposed pipe 66 which is connected at its upper end to the container 56. Container 56 carries a float 67 having a rod 68 extending from its upper end and through an aperture 69 in the top of the container. The upper end of rod 68 has a cam 70 projecting laterally therefrom which is adapted to engage and swing lever 60 about its pivot and adjacent the upper end of float 67, the rod is provided with another laterally projecting cam 71 which operates lever 54. Tell tale slots 72 are provided near the top of container 56.

A combination pressure and vacuum valve 73 is mounted on and connected to the tank just below roof 12. It is preferably mounted at a point that will permit the pressure side of the valve to discharge part of the liquid from the tank when the pressure thereof against the roof exceeds the amount necessary to raise the roof to its high position indicated 12B. The vacuum side of the valve will prevent the formation of a vacuum in the tank when for any reason the tank is not operated so as to keep the liquid stored in contact with the roof of the tank.

A vent 78 controlled by a suitable valve 79 is connected at any convenient point to roof 12 to permit the escape of air from the tank when it is being initially filled with liquid. As soon as the tank is filled with liquid, valve 79 may be closed and maintained in closed position during all subsequent introductions of product into the tank and withdrawals therefrom.

The operation of the tank is as follows:— Assuming that the tank is completely empty of liquid to be stored and water, the roof 12 will be in its low position indicated by a dot and dash line on the drawing and designated 12A and the closed end of pipe 15 will rest on the bottom 24 of cylinder 18. Valves 34, 27 and 29 will be open and valve 39 will be closed with float 67 in its lowest position in container 56. Hand valve 33 is opened and water will flow from a source of supply through pipe 32, valve 34 and pipe 35 onto roof 12 and down through pipe 15 and through slots 17 into the tank. If it is desired to store the maximum volume of liquid the tank is designed to accommodate, water is permitted to flow into the tank until the level 44 is reached as determined by valve 45 and when this level is reached, valve 33 is closed. Valve 31 is then opened manually and the liquid to be stored is delivered to the tank through pipe 30, valve 29, pipe 28, valve 27 and pipe 26 until the tank is filled. When the level of the liquid comes in contact with the roof 12, the liquid will exert a pressure on the roof and flex the roof upwardly and the liquid will continue to flow into the tank and the roof will continue its upward flexing until the roof reaches its high position shown in dot and dash lines in the drawing and indicated 12B when the roof will have moved post 51 and lever 48 to such an extent that valve 27 will be closed and the flow of liquid into the tank will automatically be cut off. At this time, valve 31 is manually closed. As soon however, as roof 12 reaches its neutral position shown in full lines in the drawing, the lower end of pipe 15 will just make contact with the upper end of cylinder 18 and prevent water flowing into the cylinder, but movement of the roof above its neutral position will withdraw the end of pipe 15 from the cylinder and water will flow from the bottom of the tank into the cylinder and into pipes 37 and 38. The pressure of the liquid on the roof when above its neutral position will cause the level of the water in pipe 15 and container 56 to rise sufficiently to raise float 67 enough to move cam 70 out of contact with lever 60 and permit the weight 62 to open valve 39 and allow water to flow from the bottom of the tank as long as the lower end of pipe 15 is above the upper end of cylinder 18. Consequently when the roof has moved to its high position, and valve 27 has been closed, water will flow from the bottom of the tank until the roof returns to its neutral position (valve 31 having been closed) and closes cylinder 18 and opens valve 27. As soon as the roof returns to its neutral position, the water level in pipe 15 and container 56 will return to level 74, float 67 will return to its lowermost position in container 56, and will close valve 39. With the tank filled with liquid above level 44, water will stand in pipe 15 and in receptacle 56 at the level 74 and the water level in the bottom of the tank will be just above the upper ends of slots 17 but somewhat below level 44. Float 67 will be in its lowest position, valve 27 will be open and valve 39 closed. Inasmuch as valve 34 is closed, valve 33 in the water line may be manually opened.

To withdraw liquid from the tank it is merely necessary to open manually operated valve 31 in the liquid product line. As soon as valve 31 is opened, liquid will be withdrawn from the tank through pipe 26, the roof will drop to its low position 12A, valve 34 will be opened, water will be delivered to the roof of the tank and will flow into pipe 15 and through the slots 17 into the bottom of the tank and will continuously move the body of stored liquid upwardly as liquid is withdrawn, and keep the liquid in contact with the roof of the tank. Water should preferably be delivered to the roof of the tank and thence into the bottom of the tank at a rate equal to or greater than the rate of withdrawal of liquid from the tank through pipe 26 to keep the liquid in contact with the roof and prevent the formation of a vapor space above the liquid. When the desired amount of liquid has been withdrawn, valve 31 is manually closed. Water will continue to flow into the bottom of the tank until the roof is moved upwardly to its neutral position and closes valve 34. When the level of the water in the tank rises above level 44, with the tank full of liquid product and water, the water level in pipe 15 and in container 56 rises, moves float 67 upwardly and opens valve 39.

The roof remains in neutral position until more liquid is withdrawn from the tank or until liquid is delivered to the tank for storage. The operation of the tank for withdrawal of liquid has already been described. To deliver more liquid to the tank, valve 31 is opened and the liquid is pumped into the tank through pipe 26 with sufficient pressure to slightly raise the roof above its neutral position but not to its high position so as not to close valve 27. This movement of the roof will uncover cylinder 18 and water will flow out of the tank through pipes 37 and 38, valve 39 and pipe 42 as the liquid product flows into the tank. Valve 34 in the water line remains closed. When the water level in the tank has dropped to level 44, the float 67 will have moved to its lowest position and valve 39 will be closed and thus prevent the further flow of water from the tank and the flow of product into the water off-take line.

During withdrawal of liquid from the tank it is desirable to cut off the flow of the liquid before all the liquid is withdrawn to prevent the entrance of water into the liquid line. This is accomplished automatically as follows: The container 56 is so located with respect to the tank 10 that when the water in the tank has reached the level 75, float 67 will have moved to its highest position and cam 71 will have moved lever 54 and closed valve 29 and thus shut off the flow of liquid product from the tank. Roof 12 will then be moved upwardly to its neutral position and will close valve 34 and shut off the flow of water to the roof and to the tank. As soon as the water reaches the level 75, water will flow out of telltale slots 72 and give visible notice that the highest desirable water level in the tank has been reached.

After the maximum desirable amount of liquid has been withdrawn from the tank, it is again filled with liquid in the following manner: With valve 29 closed, the liquid is forced through the liquid line 30 with sufficient pressure to open the valve and permit liquid to be delivered to the tank. No great force is required to open valve 29 since it is held in closed position only by float 67. When liquid enters the tank, the roof will be flexed upwardly to a slight extent as previously described when liquid is delivered to the tank and the upward movement of the roof will uncover cylinder 18 and permit water to flow from the bottom of the tank. As soon as the water level drops below level 75, float 67 will move downwardly and open valve 29 so that it will no longer be necessary to hold it open by the pressure of the liquid flowing into the tank. Liquid continues to flow into the tank until the flow is cut off manually by valve 31 or automatically when the water level in the tank drops to level 44 as has previously been described.

With this arrangement, the stored liquid is always in contact with the tank roof and since there is no vapor space in the tank, there will be substantially no breathing losses. Moreover, a blanket of water is maintained over the entire roof which insulates the roof against the heat of the sun and maintains the temperature of the stored liquid at a lower temperature and also seals the roof and prevents loss of the stored liquid by leakage through the seams of the roof. Water is automatically prevented from flowing into the liquid line and the liquid is automatically prevented from getting into the water off-take lines.

Instead of forcing valve 29 open by the pressure of the liquid when refilling the tank as described hereinabove, the valve 29 may be bypassed if desired. Such by-pass may consist of a pipe 76 and a valve 77, the pipe being connected at one end to pipe 28 and at its other end to pipe 30 substantially as shown in dotted lines in Fig. 1. When the tank has been emptied of liquid until the water reaches the level 75 and valve 29 has been closed and it is desired to deliver liquid to the tank, valve 77 is opened and the liquid will flow around valve 29 through by-pass 76. As soon as the water level has dropped below level 75, valve 29 will have opened and valve 77 may be closed.

The highest position of the float 67 in container 56 corresponds to the minimum amount of volatile liquid carried in the tank and the lowest position of the float 67 corresponds to the maximum amount of volatile liquid carried therein. The minimum amount of liquid would be that amount in the tank when the water reaches the level 75 and the maximum amount of liquid would be that amount when the water in the tank is at the level 44. Consequently the float rod 68 may, if desired, be calibrated on one side in gallons or barrels, to indicate the amount of volatile liquid in the tank and calibrated on the other side in feet and inches to indicate the height of the water level in the tank.

Although the invention has been described and illustrated as embodying certain automatic features for controlling the flow of stored liquid and water to and from the tank, it will be understood that the automatic feaures may be omitted if desired. If omitted, the flow of liquid and water is controlled manually, but the operation of the tank would otherwise be substantially the same.

The invention is particularly well adapted to the storing of gasoline but it will be understood that it is equally well adapted to the storage of other volatile liquids.

It is understood the invention is not restricted to the preferred form herein disclosed but that it is only limited by the scope of the appended claims.

What I claim is:

1. A storage tank for volatile liquids comprising a receptacle, a roof for the receptacle rigidly attached around its periphery to the receptacle but flexible upwardly and downwardly within said periphery, means controlled by the roof for delivering water to the bottom of the receptacle and withdrawing it therefrom, means for introducing liquid into the receptacle and withdrawing it therefrom and additional means external to said receptacle for controlling the flow of liquid and water to and from the tank so that the liquid is substantially at all times maintained in contact with the roof of the receptacle.

2. A storage tank for volatile liquids comprising a receptacle, a roof for the receptacle rigidly attached around its periphery to the receptacle and being flexible upwardly and downwardly within said periphery, means actuated by the flexing portion of said roof for delivering water to the bottom of the receptacle and withdrawing it therefrom, means for introducing liquid into the receptacle and withdrawing it therefrom, means for controlling the flow of liquid and water to and from the tank so that the liquid is substantially at all times maintained in contact with the roof of the receptacle and means for maintaining a blanket of water over the roof.

3. A storage tank for volatile liquids comprising a receptacle, a roof for the receptacle rigidly attached around its periphery to the receptacle and being flexible upwardly and downwardly within the confines of said periphery, means for delivering water to the bottom of the receptacle intermediate storage basin supported by said roof through which said water must pass before being delivered to bottom of said receptacle, a valve operated by the roof for controlling the flow of water to the receptacle, means for introducing liquid into and withdrawing it from the receptacle and means for maintaining the liquid in contact with the roof of the receptacle.

4. A storage tank for volatile liquids comprising a receptacle, a diaphragm type roof for the receptacle, means for delivering water to the roof of the receptacle, means for conducting the water from the roof to the bottom portion of the receptacle, a valve connected to the roof and operated thereby for controlling the flow of water to the receptacle, means for introducing liquid into the receptacle and withdrawing it therefrom and means for maintaining the liquid in contact with the roof of the receptacle.

5. A storage tank for volatile liquids comprising a receptacle, a diaphragm type roof for the receptacle, means for delivering water to the roof, a pipe connected to the roof through which water is conducted from the roof to the bottom of the receptacle, means operated by said pipe for controlling the flow of water from the receptacle and means for introducing liquid into and withdrawing it from the receptacle.

6. A storage tank for volatile liquids comprising a receptacle, a diaphragm type roof for the receptacle, means for delivering water to the roof, a pipe connected to the roof adapted to conduct water from the roof to the bottom of the receptacle, a cylinder in the receptacle, a pipe connected to the cylinder through which water is withdrawn from the receptacle, the lower end of the first mentioned pipe being closed and cooperating with said cylinder to control the flow of water from the receptacle and means for introducing liquid into and withdrawing it from the receptacle.

7. A storage tank for volatile liquids comprising a receptacle, a diaphragm type roof for the receptacle, means for delivering water to the roof, a pipe connected to the roof adapted to conduct water from the roof to the bottom of the receptacle and having its inlet end above the roof, a cylinder in the bottom of the receptacle, a pipe connected to the cylinder for withdrawing water from the receptacle, the lower end of the pipe connected to the roof being closed and cooperating with the cylinder to control the flow of water from the receptacle, stops for limiting the movement of the pipe connected to the roof and means for delivering liquid to and withdrawing it from the receptacle.

8. A storage tank for volatile liquids comprising a receptacle having a diaphragm type roof, means for delivering water onto the roof, a pipe connected to the roof and extending longitudinally of the receptacle and having its inlet end above the roof, an opening adjacent the lower end of the pipe, a cylinder in the bottom of the receptacle, a pipe connected to the cylinder, the lower end of the pipe connected to the roof being closed and adapted to enter said cylinder and a pipe connected to the upper end of the receptacle below the roof for delivering liquid to and withdrawing it from the receptacle.

9. A storage tank for volatile liquids comprising a receptacle, a diaphragm type roof for the receptacle, means for delivering liquid to and withdrawing it from the receptacle, a pipe for delivering water to the roof of the receptacle, means for conducting the water from the roof to the bottom of the receptacle, means for withdrawing water from the bottom of the receptacle, a valve in said pipe, and a connection between the valve and the roof.

10. A storage tank for volatile liquids, comprising a receptacle having liquid therein, means for introducing liquid into the receptacle and withdrawing it therefrom, a diaphragm type roof for the receptacle adapted to be flexed by the pressure of the liquid in the receptacle thereon, said roof having low, high and neutral positions, a pipe for delivering water to the roof of the receptacle, a valve in said pipe, a connection between the valve and the roof arranged to close said valve when the roof is in its neutral position.

11. A storage tank for volatile liquids, comprising a receptacle having liquid therein, means for introducing water into the bottom of the receptacle and withdrawing it therefrom, a pipe for delivering liquid to the receptacle and withdrawing it therefrom, a diaphragm type roof for the receptacle adapted to be flexed by the pressure of the liquid thereon, said roof having low, high and intermediate positions, a valve in said pipe and a connection between the valve and the roof arranged to close the valve when the roof is in its high position.

12. A storage tank for volatile liquids and the like comprising a receptacle, a diaphragm type roof for the receptacle, a pipe for introducing liquid into the receptacle and withdrawing it therefrom, means for introducing water into the bottom of the receptacle as liquid is withdrawn and for withdrawing water from the bottom of the receptacle as liquid is delivered to the receptacle, the level of water in the receptacle varying from a low to a high level, a valve in said pipe, a float chamber connected to the receptacle and adapted to receive water therefrom, a float in said chamber, means for normally holding said valve in open position and means for closing said valve by the float when the water in the receptacle reaches its high position.

13. A storage tank for volatile liquids and the like, comprising a receptacle, a diaphragm type roof for the receptacle, a pipe connected to the upper portion of the receptacle below the roof and adapted to deliver liquid to the receptacle and withdraw it therefrom, a pipe for delivering water to the roof of the receptacle, a pipe connected to the roof and disposed longitudinally of the receptacle, said pipe connected to the roof having its inlet end above the roof and having an opening adjacent the lower end of the pipe through which water flows from the roof into the bottom of the receptacle, a cylinder in the bottom of the receptacle, a pipe connected to said cylinder through which water is adapted to flow from the receptacle, the lower end of the pipe connected to the roof being closed and adapted to be received in said cylinder and to control the flow of water from the bottom of the receptacle, said roof adapted to be flexed by the pressure of the liquid in the receptacle thereon, said roof having low, intermediate and high positions, the water in the receptacle varying from a low to a high level, the water being introduced into the receptacle as liquid is withdrawn therefrom and withdrawn from the receptacle as liquid is introduced thereinto so that the receptacle is continually filled with liquid and water, a valve in the pipe for delivering water to the roof of the receptacle, a connection between said valve and the roof arranged to open said valve when the roof is in its low position and to close the valve when the roof is in its neutral position, a valve in the pipe for delivering liquid to the tank and withdrawing it therefrom, a connection between said valve and the roof arranged to open said valve when the roof is in its low and intermediate positions and to close said valve when the roof is in its high position, a float chamber connected to the receptacle and adapted to receive water therefrom, a float in said chamber, a second valve in said pipe for delivering liquid to and withdrawing it from the receptacle, a lever for operating said valve and for normally holding it in open positon, a cam on said float adapted to engage the lever operating said last mentioned valve to close said valve when the water in the receptacle has reached its high level, a valve in the pipe connected to the cylinder in the bottom of the receptacle and through which water is withdrawn from the receptacle, a lever connected to said valve and arranged to normally hold in said valve in open position, a second cam on said float adapted to engage the lever connected to said last mentioned valve and to close said valve when the water in the receptacle has reached its low position.

14. A storage tank for volatile liquids comprising a receptacle, a roof for the receptacle rigidly attached around its periphery to the receptacle and being flexible upwardly and downwardly within the confines of said periphery upon changes in upward and downward pressure to which said roof is subjected, means for introducing liquid into and withdrawing it from the receptacle, means for introducing water into the lower part of the receptacle, said last-named means including an intermediate water storage basin supported by said roof, means controlled by the roof for withdrawing water from the receptacle and means for maintaining the liquid in contact with the roof of the receptacle during storage and during filling and emptying of the receptacle.

CLIFFORD A. ELLIS.